United States Patent
Rossi et al.

(10) Patent No.: US 8,751,761 B2
(45) Date of Patent: *Jun. 10, 2014

(54) SNAPBACK-FREE LOGICAL DRIVE DUPLICATION

(75) Inventors: Robert P. Rossi, Altamonte Springs, FL (US); Douglas L. Anderson, Oviedo, FL (US)

(73) Assignee: Xyratex Technology Limited, Havant (GB)

( * ) Notice: Subject to any disclaimer, the term of this patent is extended or adjusted under 35 U.S.C. 154(b) by 621 days.

This patent is subject to a terminal disclaimer.

(21) Appl. No.: 12/707,426

(22) Filed: Feb. 17, 2010

(65) Prior Publication Data

US 2011/0202720 A1    Aug. 18, 2011

(51) Int. Cl.
- *G06F 11/14* (2006.01)
- *G06F 11/20* (2006.01)

(52) U.S. Cl.
CPC ........ *G06F 11/1446* (2013.01); *G06F 11/2064* (2013.01)
USPC ............ 711/162; 711/112; 711/114; 707/660

(58) Field of Classification Search
CPC .......................... G06F 11/1446; G06F 11/2064
USPC ............................ 711/112, 114, 162; 707/660
See application file for complete search history.

(56) References Cited

U.S. PATENT DOCUMENTS

| | | | | |
|---|---|---|---|---|
| 5,402,428 | A | * | 3/1995 | Kakuta et al. ................. 714/5.11 |
| 5,487,160 | A | * | 1/1996 | Bemis ............................ 711/114 |
| 7,467,268 | B2 | * | 12/2008 | Lindemann et al. ........... 711/162 |

OTHER PUBLICATIONS

Patterson, et al., "A Case for Redundant Arrays of Inexpensive Disks (RAID)", Association for Computing Machinery (ACM), 1988, pp. 109-116.

* cited by examiner

*Primary Examiner* — Stephen Elmore
*Assistant Examiner* — Mark Giardino, Jr.
(74) *Attorney, Agent, or Firm* — Pillsbury Winthrop Shaw Pittman LLP

(57) ABSTRACT

There is provided a method of duplicating a logical drive. The method includes sequentially copying data from a source logical drive to a destination logical drive and determining whether a write request is received to a data area on the source logical drive which has not yet been copied to the destination logical drive. If a write request is detected, the data at the write-requested data area is copied to the destination logical drive prior to executing the write request. By providing such a method, the destination logical drive can be used as the change-data store while in the process of the duplication operation, removing the need for a snapshot logical drive in the duplication process. This results in improvements in duplication speed and reduces drive wear due to the reduced number of data reads/writes.

20 Claims, 5 Drawing Sheets

SNAPBACK-FREE LOGICAL DRIVE DUPLICATION

The present invention relates to a method of, and apparatus for, duplicating a logical drive.

There are a number of possible architectures for storage systems such as data stores in networked computer systems. These systems often feature a large number of storage devices such as hard disks which are networked together. One arrangement of disk drives is known as a redundant array of inexpensive disk (RAID) arrays are the primary storage architecture for large, networked computer storage systems. The RAID architecture was first disclosed in "A Case for Redundant Arrays of Inexpensive Disks (RAID)", Patterson, Gibson, and Katz (University of California, Berkeley). RAID architecture combines multiple small, inexpensive disk drives into an array of disk drives that yields performance exceeding that of a single large drive.

There are a number of different RAID architectures, designated as RAID-1 through RAID-6. Each RAID architecture offers different trade-offs in terms of features and performance. In addition to the different architectures, a non-redundant array of disk drives is referred to as a RAID-0 array. RAID controllers provide data integrity through redundant data mechanisms, high speed through streamlined algorithms, and accessibility to stored data for users and administrators.

RAID architecture provides data redundancy in two basic forms: mirroring (RAID 1) and parity (RAID 3, 4, 5 and 6). The implementation of mirroring in RAID 1 architectures involves creating an identical image of the data on a primary disk on a secondary disk. The contents of the primary and secondary disks in the array are identical. Mirroring enables a system to maintain automatically one or more copies of data so that, in the event of a disk hardware failure, a system can quickly recover lost data. Mirroring may be performed locally or remotely as part of a disaster recovery process, or both.

RAID 3, 4, 5, or 6 architectures generally utilise three or more disks of identical capacity. In these architectures, two or more of the disks are utilised for reading/writing of data and one of the disks stores parity data. Data interleaving across the disks is usually in the form of data "striping" in which the data to be stored is broken down into blocks called "stripe units". The "stripe units" are then distributed across the disks. Therefore, should one of the disks in a RAID group fail or become corrupted, the missing data can be recreated from the data on the other disks. The data may be reconstructed through the use of the redundant "stripe units" stored on the remaining disks.

A RAID array is usually presented to the host user as one or more logical drives. A logical drive is a usable region of storage capacity located on one or more physical disk drive components in a computer system. The drive is referred to as logical (or, sometimes, virtual) because it does not actually form a physical entity in its own right, and may comprise, for example, a partition on one or more disks in a RAID array.

In most modern storage networks, a number of storage devices are connected to many host server devices in a storage network. A single RAID array may provide capacity to one or more servers. In this case, logical drives are used to partition the available capacity and provide the amount of storage needed by each host from a common pool of logical drives.

Many modern disk controllers implement a feature known as logical drive duplication. This enables a user to generate an identical copy of a logical drive for backup or reference purposes. The copy of the logical drive resides on another physical storage area of the disk array, or on an entirely different disk array.

The time taken to perform a logical drive duplication operation will depend upon the size of the logical drive to be duplicated. In the case of a large logical drive, the time taken may be significant. The performance and availability of a system can be greatly hindered when a logical drive must be taken offline to perform a duplication operation.

Instead of taking a logical drive offline, an alternative is to disable temporarily write access to data during the duplication, either by stopping the accessing applications or by using a locking application provided by the operating system to enforce exclusive read access.

The above arrangements may be acceptable for low-demand systems or non-time critical environments such as, for example, desktop computers or small workgroup servers. However, high-demand systems or critical-access systems such as storage area networks cannot afford to be inoperative for such time periods.

A known solution is to use a snapshot engine. A snapshot is a copy of a data set of the source logical drive which is frozen at a point in time. This data is stored on a snapshot logical drive. When a snapshot is first created, only meta-data relating to the configuration in which the source data is stored on the source logical drive is obtained and stored on the snapshot logical drive. Since there is no actual copying of data from the source logical drive to the snapshot logical drive, the creation of the snapshot image is extremely fast and almost instantaneous.

The snapshot image then monitors and tracks any writes to logical blocks on the source logical drive. If a write is requested to a particular logical block of data, the original data is copied onto the snapshot logical drive before the write is allowed to the logical block. This is known as a "copy-on-write". This maintains on the snapshot logical drive a consistent image of the source logical drive at the exact time the snapshot was taken.

For a read request to a logical block on the source logical drive, it is first determined whether the logical block of data has been modified by having been written to. If the logical block of data has not been written to, then the read request is directed to the source logical drive. However, if the read request is directed to a logical block of data which has been written to since the snapshot was taken, then the read request is directed to the copied logical block stored on the snapshot logical drive.

Therefore, snapshots enable source data protection during duplications and allows for continued normal host access of the source logical drive being duplicated. This, therefore, preserves a self-consistent past image of the logical drive. The snapshot image contains the meta-data describing the logical blocks of data that have changed since the snapshot was first created, together with a copy of the original data of those logical blocks when the first write request to the logical blocks are received. The duplication engine then uses the snapshot data as a source logical drive for copying data which has changed onto the destination logical drive.

An alternative method of using a snapshot engine is to copy the data directly from the source logical drive and to allow writes to occur during this process. This may result in the destination logical drive comprising temporary corruptions due to writes occurring on the source logical drive during the duplication process. However, this temporary corruption is corrected by performing a "snapback" from the snapshot logical drive.

A snapback describes the process whereby the newly duplicated (destination) logical drive is updated with data sourced from the snapshot logical drive. This will update only the data blocks which were modified (e.g. written to) during the duplication process, because the snapshot contains only this data. Once the snapback process is complete, the duplicated logical drive is freed from temporary corruption and contains an identical copy of the data on the source logical drive.

However, a disadvantage of the above approaches is that storage space is required for a snapshot logical drive. The greater the number of writes that are issued to the source logical drive during the duplication process, then a greater amount of data is required to be stored by the snapshot, increasing the size of the storage area required.

Further, the greater the amount of data that is stored by the snapshot, the greater the amount of data that needs to be read from the snapshot logical drive and copied to the destination logical drive. This increases the time required to complete the duplication of the source logical drive. Further, in cases where temporarily corrupted data on the destination logical drive is overwritten by data from the snapshot logical drive, the particular block or blocks of data is written to the destination logical drive twice, causing additional writes to be required.

Therefore, known logical drive duplication methods and arrangements suffer from a technical problem that the duplication process requires a snapshot logical drive to be created and involves plural steps in order to duplicate the data on a source logical drive. This increases the number of writes that need to happen to copy a logical drive, reducing the speed at which a duplication operation can be carried out.

According to a first aspect of the present invention, there is provided a method of duplicating a logical drive, comprising: starting said duplication, sequentially copying data from a source logical drive to a destination logical drive; and determining whether, subsequent to starting said duplication, a write request is received to a data area on the source logical drive which has not yet been copied to said destination logical drive and, if such a write request is received, copying the data at said write-requested data area to the destination logical drive prior to executing said write request.

By providing such a method, the destination logical drive can be used as the change-data store while in the process of the duplication operation, removing the need for a snapshot logical drive in the duplication process. This improves duplication speed and reduces drive wear due to the reduced number of data reads/writes.

In one approach, if said write request is received, the method further comprises the step of ignoring the data at said write-requested data area during said sequential copying step. This approach means that data which has already been copied to the destination logical drive can be skipped during said sequential copying steps. This has benefits in terms of the number of copies required to be made and the increased speed of the duplication operation.

In another approach, if said write request is received, the method further comprises the step of storing information regarding said write-requested data in a data file or memory. In a variation, said data file is a bitmap.

By providing such a method, write-requested data which has already been copied to the destination logical drive can be tracked and monitored.

In one example, said step of ignoring said data at said write-requested data area involves determining, from said data file, the data area to be ignored during said sequential copying. The data file (or bitmap) provides a reference for a sequential copy engine to know which data to ignore during the sequential copy steps.

In one version, said data is arranged in a plurality of logical blocks. In a variation, the step of sequential copying starts with the first or last logical block in a group of logical blocks. In a further variation, the step of sequential copying starts with the first or last logical block on the source drive.

In one variation, the method further comprises, prior to said sequential copying, initialising said duplication process, wherein said step of determining whether a write request is received comprises determining whether a write request is received after said initialisation.

According to a second aspect of the present invention, there is provided an apparatus for duplicating a logical drive, the apparatus comprising: a controller operable to start said duplication and to copy sequentially data from a source logical drive to a destination logical drive; and an access manager operable to determine whether, subsequent to starting said duplication, a write request is received to a data area on the source drive which has not yet been copied to said destination logical drive and, if such a write request is received, the controller is further operable to copy the data at said write-requested data area to the destination logical drive prior to executing said write request.

By providing such an apparatus, the destination logical drive can be used as the change-data store while in the process of the duplication operation, removing the need for a snapshot logical drive in the duplication process. This improves duplication speed and reduces drive wear due to the reduced number of data reads/writes.

In a variation, if said write request is received, the apparatus is further operable to ignore the data at said write-requested data area during said sequential copying step.

In a further variation, if said write request is received, the apparatus is further operable to store information regarding said write-requested data area in a data file or memory. In one arrangement, said data file is a bitmap.

In one example, the apparatus is further operable to determine, from said data file, the data area to be ignored during said sequential copying.

In one example, said data is arranged in a plurality of logical blocks. In a further example, the apparatus is further operable to start said sequential copying with the first or last logical block in a group of logical blocks. In a yet further example, the apparatus is further operable to start said sequential copying with the first or last logical block on the source drive.

In one variation, the apparatus is further operable to, prior to said sequential copying, initialise said duplication process, wherein said step of determining whether a write request is received comprises determining whether a write request is received after said initialisation.

In a variation, the apparatus of the second aspect of the invention is in the form of a controller. In a further variation, the controller is a RAID controller.

In a variation, the RAID controller comprises firmware, software or a combination of both on a host.

In an alternative variation, the RAID controller comprises firmware, software or a combination of both in an off-host controller.

According to a third aspect of the present invention, there is provided a data storage resource comprising at least one physical drive and a controller.

According to a fourth aspect of the present invention, there is provided a computer program product executable by a programmable processing apparatus, comprising one or more software portions for performing the steps of the first aspect of the present invention.

According to a fifth aspect of the present invention, there is provided a computer usable storage medium having a computer program product according to the fourth aspect of the present invention stored thereon.

Embodiments of the present invention will now be described in detail with reference to the accompanying drawings, in which.

Figure 1:
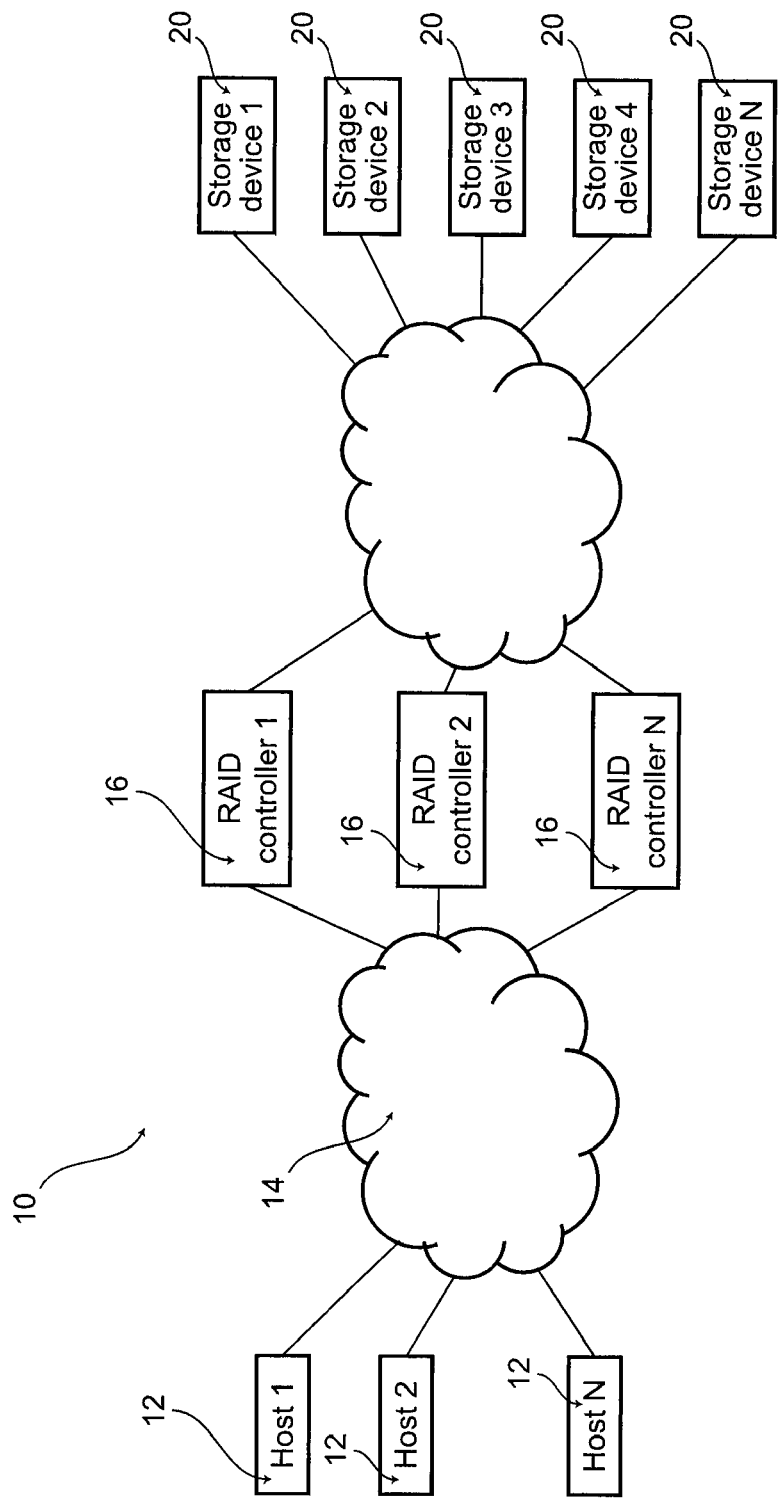
FIG. 1 is a schematic diagram of a networked storage resource.

FIG. 1 shows a schematic illustration of a networked storage resource 10 in which the present invention may be used. The networked storage resource 10 comprises a plurality of hosts 12. The hosts 12 are representative of any computer systems or terminals that are operable to communicate over a network. Any number of hosts 12 may be provided; N hosts 12 are shown in FIG. 1, where N is an integer value.

The hosts 12 are connected to a first communication network 14 which couples the hosts 12 to a plurality of RAID controllers 16. The communication network 14 may take any suitable form, and may comprise any form of electronic network that uses a communication protocol; for example, a local network such as a LAN or Ethernet, or any other suitable network such as a mobile network or the internet.

The RAID controllers 16 are connected through device ports (not shown) to a second communication network 18, which is also connected to a plurality of storage devices 20. The RAID controllers 16 may comprise any storage controller devices that process commands from the hosts 12 and, based on those commands, control the storage devices 20. RAID architecture combines a multiplicity of small, inexpensive disk drives into an array of disk drives that yields performance that can exceed that of a single large drive. This arrangement enables high speed access because different parts of a file can be read from different devices simultaneously, improving access speed and bandwidth. Additionally, each storage device 20 comprising a RAID array of devices appears to the hosts 12 as a single logical storage unit (LSU) or drive.

The operation of the RAID controllers 16 may be set at the Application Programming Interface (API) level. Typically, Original Equipment Manufactures (OEMs) provide RAID networks to end users for network storage. OEMs generally customise a RAID network and tune the network performance through an API.

Any number of RAID controllers 16 may be provided, and N RAID controllers 16 (where N is an integer) are shown in FIG. 1. Any number of storage devices 20 may be provided; in FIG. 1, N storage devices 20 are shown, where N is any integer value.

The second communication network 18 may comprise any suitable type of storage controller network which is able to connect the RAID controllers 16 to the storage devices 20. The second communication network 18 may take the form of, for example, a SCSI network, an iSCSI network or fibre channel.

The storage devices 20 may take any suitable form; for example, tape drives, disk drives, non-volatile memory, or solid state devices. Although most RAID architectures use hard disk drives as the main storage devices, it will be clear to the person skilled in the art that the embodiments described herein apply to any type of suitable storage device. More than one drive may form a storage device 20; for example, a RAID array of drives may form a single storage device 20. The skilled person will be readily aware that the above features of the present embodiment could be implemented in a variety of suitable configurations and arrangements.

The RAID controllers 16 and storage devices 20 also provide data redundancy. The RAID controllers 16 provide data integrity through a built-in redundancy which includes data mirroring. The RAID controllers 16 are arranged such that, should one of the drives in a group forming a RAID array fail or become corrupted, the missing data can be recreated from the data on the other drives. The data may be reconstructed through the use of data mirroring. In the case of a disk rebuild operation, this data is written to a new replacement drive that is designated by the respective RAID controller 16.

Figure 2:
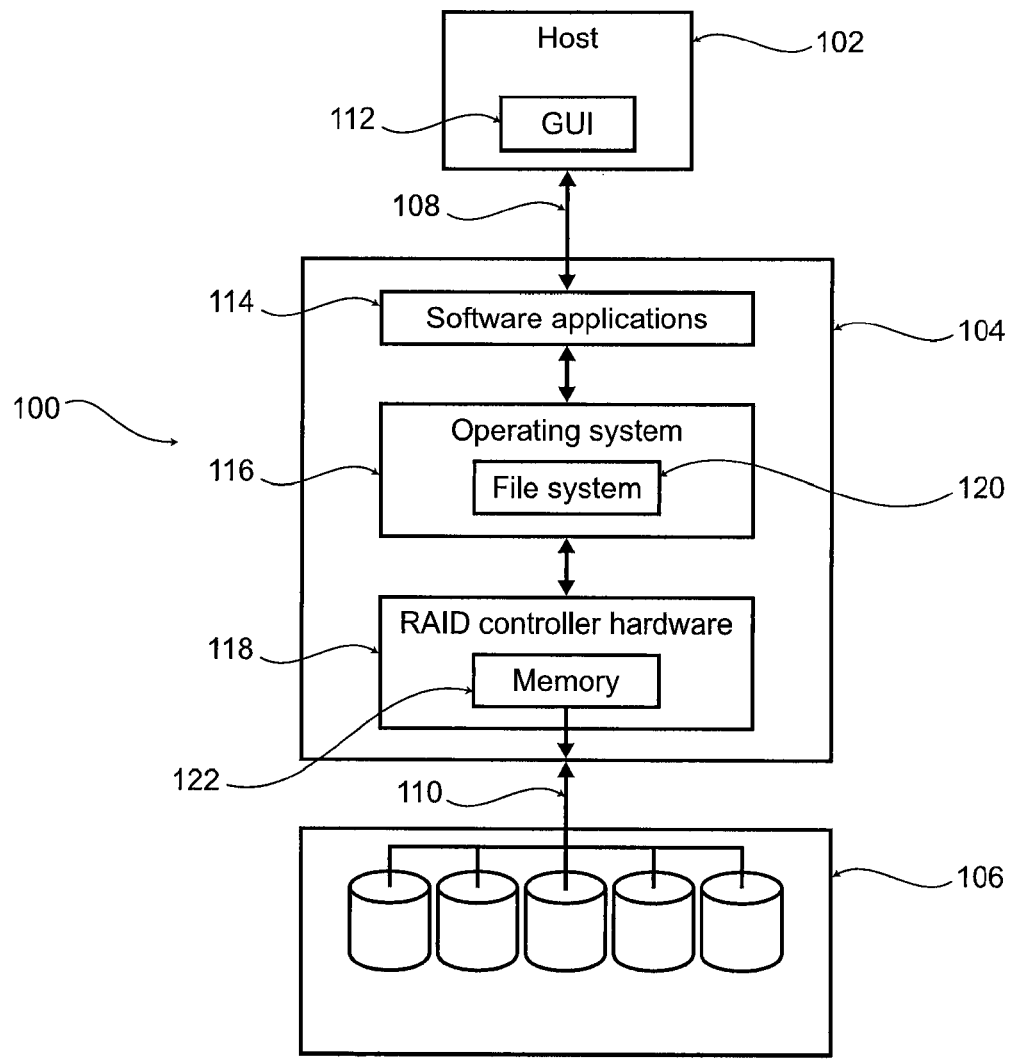
FIG. 2 is a schematic diagram showing a RAID controller suitable for use with the present invention.

FIG. 2 shows a schematic diagram of an arrangement in which the present invention may be used. A storage area network 100 comprises a host 102, a RAID controller 104, and a storage device 106. The host 102 is connected to the RAID controller 104 through a communication network 108 such as an Ethernet and the RAID controller 104 is, in turn, connected to the storage device 106 via a storage network 110 such as an iSCSI network.

The host 102 comprises a general purpose computer (PC) which is operated by a user and which has access to the storage area network 100. Any number of hosts 102 may be provided. However, for clarity, only one host 102 is shown in FIG. 2. A graphical user interface (GM) 112 is run on the host 102. The GUI 112 is a software application used to input attributes for the RAID controller 104, and acts as a user interface for a user of the host 102.

The RAID controller 104 comprises a software application layer 114, an operating system 116 and RAID controller hardware 118. The software application layer 114 comprises software applications including the algorithms and logic necessary for the initialisation and run-time operation of the RAID controller 104. The software application layer 114 includes software functional blocks such as a system manager for fault management, task scheduling and power management. The software application layer 114 also receives commands from the host 102 (e.g., assigning new volumes, read/write commands) and executes those commands. Commands that cannot be processed (because of lack of space available, for example) are returned as error messages to the user of the host 102.

The operating system 116 utilises an industry-standard software platform such as, for example, Linux, upon which the software applications forming part of the software application layer 114 can run. The operating system 116 comprises a file system 120 which enables RAID controller 104 to store and transfer files.

The RAID controller hardware 118 is the physical processor platform of the RAID controller 104 that executes the software applications in the software application layer 114. The RAID controller hardware 118 comprises a microprocessor, memory 122, and all other electronic devices necessary for RAID control of storage device 106.

Figure 3:
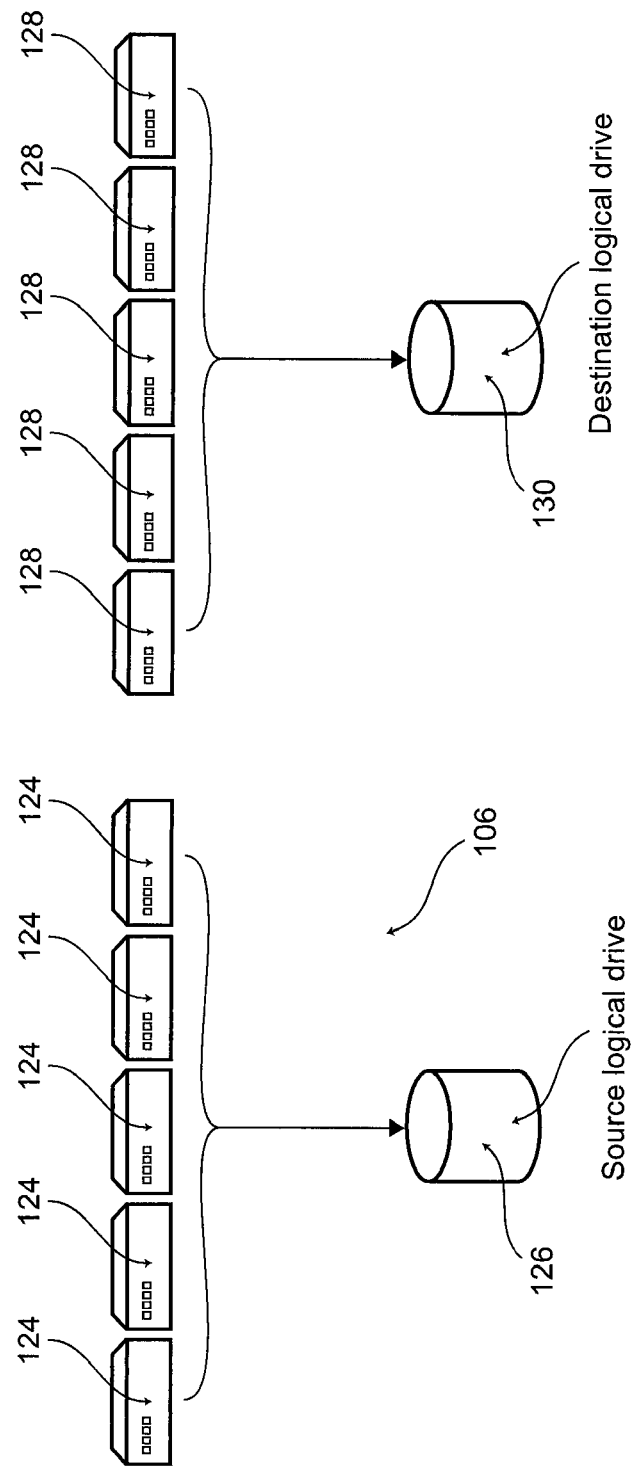
FIG. 3 is a schematic diagram showing physical drives and logical drives.

The storage device 106 comprises a plurality of physical drives (see FIG. 3). The physical drives may be any form of storage device, such as, for example, tape drives, disk drives, non-volatile memory, or solid state devices. Although most RAID architectures use hard disk drives as the main storage devices, it will be clear to the person skilled in the art that the embodiments described herein apply to any type of suitable storage device.

FIG. 3 shows a schematic diagram of the storage device 106 in more detail. The storage device 106 comprises a plurality of physical drives 124. In this embodiment, each physical drive 124 comprises a hard disk drive of large capacity, for example, 1 TB. The physical drives 124 form part of a RAID array and the data stored thereon is, in some RAID configurations (for example, RAID-5), stored in the form of data "stripes" in which the data to be stored is broken down into blocks called "stripe units". The "stripe units" are then distributed across the physical drives 124. The RAID controller 104 is arranged such that, should one of the physical drives 124 in the group fail or become corrupted, the missing data can be recreated from the data on the other physical drives 124. The data may be reconstructed through the use of the redundant "stripe units" stored on the remaining physical drives 124.

The RAID array of physical drives 124 is, via the RAID controller 104, presented as a logical drive 126, upon which one or more volumes may be defined and which can be read/write accessed by the host 102 as a single volume. The logical drive 126 may be considered to be a usable region of storage capacity located on one or more of the physical disk drive components 124 forming the logical drive 126. The RAID array of physical drives 124 may comprise any number of logical drives 126. However, for clarity, only one is shown and described herein.

The logical drive 126 can be accessed by the host 102 and RAID controller 104 to read/write data. Input/output processing can also be carried out on the logical drive 126 in the manner of an actual physical drive; for example, defragmentation, rebuilding or backup operations.

In order to provide data security and redundancy, it is important to backup the data stored on a logical drive 126 at regular intervals. This is known as logical drive duplication. This enables a user on the host 102 to generate an identical copy of a logical drive 126 for backup or reference purposes. The copy of the logical drive 126 may reside on an entirely different logical drive or on a dedicated backup storage facility such as a tape drive. The copied logical drive is known as the source logical drive and the copied data is written to what is known as a destination logical drive.

In FIG. 3, the logical drive 126 forms the source logical drive. FIG. 3 also shows a configuration of a suitable destination logical drive. A plurality of physical drives 128 form a RAID array, similar to the physical drives 124. The physical drives 128 are controlled by a further RAID controller (not shown) different from the RAID controller 104. The further RAID controller (not shown) presents the physical drives 128 as a single logical drive 130. The logical drive 130 is configured as a destination logical drive. The RAID array of physical drives 128 may, through the further RAID controller, comprise any number of logical drives 130. However, for clarity, only one is shown and described herein.

In many cases, the time taken to duplicate a large logical drive may be considerable. If a logical drive has to be taken offline or cannot be accessed for read/write operations for a considerable period, then time and efficiency losses to the users of the storage area network may be significant. High-demand systems or critical-access systems cannot afford to be inoperative for such time periods.

Consequently, the embodiment of the present invention enables hosts to perform read/write operations to the logical drive being duplicated during the duplication operation. The arrangement for duplicating a logical drive according to an embodiment of the present invention will now be described with reference to FIG. 4.

Figure 4:
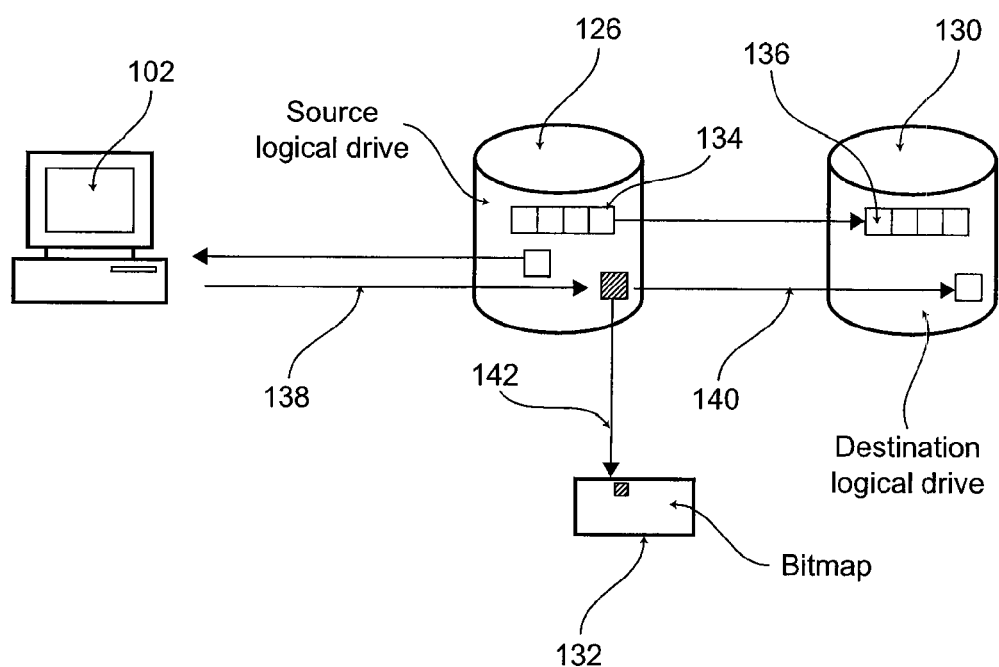
FIG. 4 is a schematic diagram of the elements and process procedure of a duplication operation.

FIG. 4 shows a schematic diagram of a logical drive duplication operation according to an embodiment of the invention. The source logical drive 126 is contains the data to be copied to the destination logical drive 130. Once the duplication operation is complete, the destination logical drive 130 will be an identical copy of the source logical drive 126 at the time the duplication operation was initiated. Therefore, the duplicate of the data on the destination logical drive 130 will not include any writes or other changes to the data that occur after the duplication operation has started and, instead, provides an exact reproduction of the source logical drive at the precise moment that the duplication operation is started.

During the duplication operation, a bitmap 132 is created. The bitmap 132 contains information relating to the duplication operation. This will be described later. The bitmap 132 may be stored in a data area of the source logical drive 126, temporary or otherwise. Alternatively, the bitmap 132 may be stored in the memory 122 of the RAID controller 104 or in any other suitable location. The bitmap 132 may take the form of, for example, a look up table.

Figure 5:
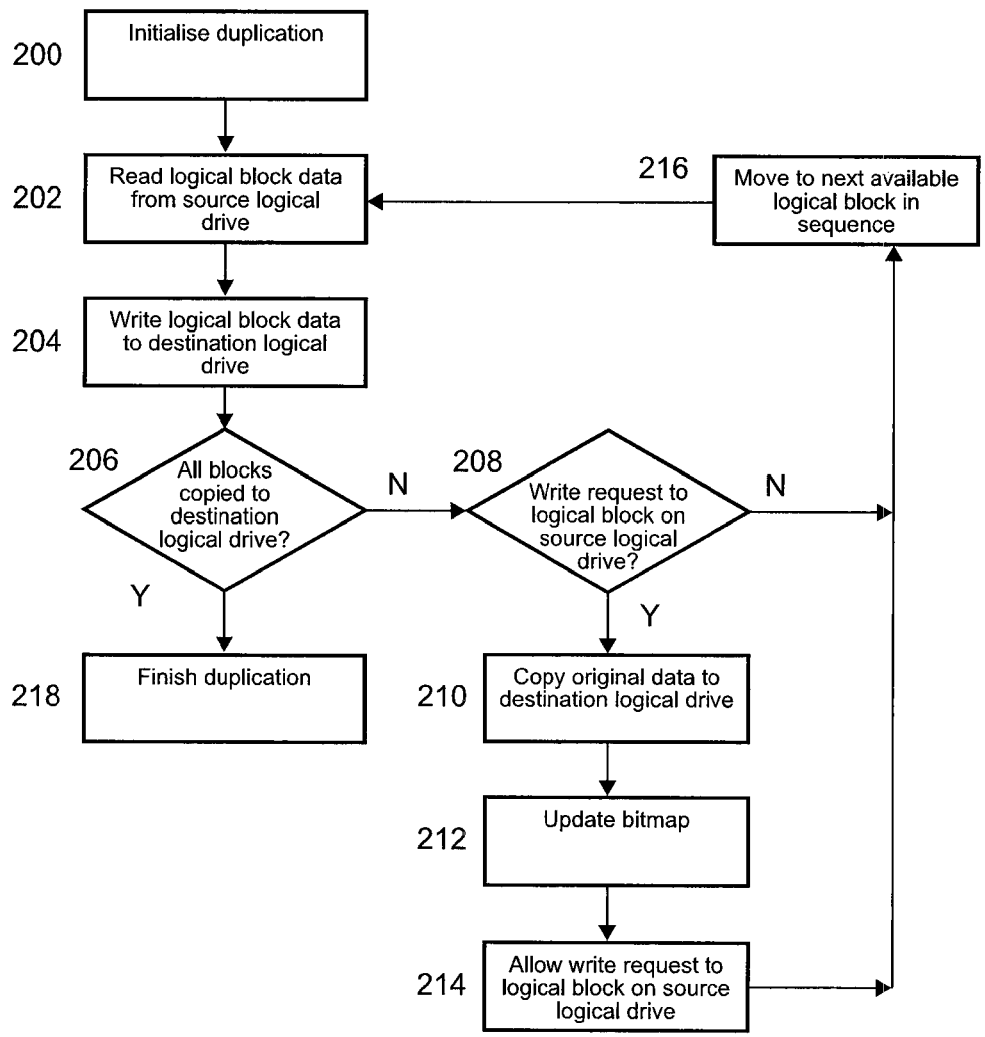
FIG. 5 is a flow diagram illustrating the duplication method according to an embodiment of the present invention.

The duplication method will now be described with reference to FIGS. 4 and 5. FIG. 5 shows a flow diagram of the method for duplicating the source logical drive 126 on the destination logical drive 130.

Step 200: Initialise Duplication

At step 200, the duplication is initialised. In other words, the duplication is started. When the duplication is complete, the destination logical drive 130 will comprise a copy of the source logical drive 126 at the point in time that the duplication process was started. This step may simply be a reference point identifying when the duplication was started, and need not require any actions to be carried out. Alternatively, additional steps may be carried out as appropriate prior to copying of data from the source logical drive 126; for example, logging the time at which the duplication was started or initialising required programs. The skilled person will be readily aware that this step could be implemented in a variety of suitable approaches and arrangements.

The method then proceeds to step 202.

Step 202: Read Logical Block Data from Source Logical Drive

At step 202, data is read from the source logical drive 126. This is the first part of the copy process—the read data is then written to the destination logical drive 130 in step 204 to complete the copy process. The data is read in units of logical blocks 132 (see FIG. 4) from the source logical drive 126. In the described example, the copy process starts with the first logical block 136 in sequence on the source logical drive 126, i.e. the data is read from the first logical block "0" in a sequence of logical blocks from 0 to N. However, any sequence may be used; for example, the read operation may start at logical block N or at any other suitable point.

The method then proceeds to step 204.

As an alternative, the step of reading may be performed in terms of multiple blocks. The skilled person would be readily aware of possible variations in the step of reading of the blocks and the combinations of blocks which could be read in a single step.

Step 204: Write Logical Block Data to Destination Logical Drive

At step 206, the data from the logical block 134 read in step 202 is copied to the destination logical drive 130 to create a duplicate 136 of the logical block 134 on the destination logical drive 130. This is shown in FIG. 4. The method then proceeds to step 206.

Step 206: All Blocks Copied to Destination Logical Drive?

Throughout the copy process, it is determined whether all of the logical blocks on the source logical drive 126 have been copied to the destination logical drive 130. If the determination is positive, then the method proceeds to step 218 and the duplication operation terminates. If, however, it is determined that there are still logical blocks to be copied on the source logical drive 126, then the method proceeds to step 208.

Whilst step 206 has been referred to herein as occurring after the first read and write steps, it will be appreciated that this step may be carried out at any point during the duplication process, or may be continuously checked for. The example shown and described herein is organised stepwise for clarity. However, the skilled person will be readily aware that this step could be implemented in a variety of suitable approaches and arrangements.

Step 208: Write Request to Logical Block on the Source Logical Drive?

At step 208 it is determined whether the host 102 has issued a write request 138 (FIG. 4) to a data area (such as a logical block) on the source logical drive 126 which has not yet been copied to the destination drive since the duplication process was initiated at step 200.

If it determined that such a write request 138 (FIG. 4) to a logical block on the source logical drive 126 is detected, then the method proceeds to step 210. If no write request to the source logical drive 126 is detected, then the method proceeds to step 216.

Alternatively, if it is determined that the host 102 has issued a write request to a data area or logical block which has already been copied in steps 202 and 204 there is no need to proceed to step 210 because a copy of the original data in this data area is already present on the destination logical drive. Additionally, if a write request is issued to a data area that has not yet been copied in steps 202 and 204, but to which a previous write request has been issued, then there is no need to proceed to step 210 because the data at this write requested area will already have been copied before the previous write request was allowed. In the above cases, a write request to an already copied data area can be executed without any additional copying steps being required.

The step of determining whether the host 102 has issued a write request 138 to a logical block on the source logical drive 126 since the duplication process was started has been referred to herein as occurring after the first read and write steps and after the determination of whether all logical blocks have been copied. However, it will be appreciated that this step may be carried out at any point during the duplication process, or may be continuously checked for throughout the duplication process. The example shown and described herein is organised stepwise for clarity. However, the skilled person will be readily aware that this step could be implemented in a variety of suitable approaches and arrangements.

Step 210: Copy Original Data to Destination Logical Drive

If, at step 208 a write request 138 to a particular data area or logical block is detected, then the original data on that particular data area or logical block is copied in a copy operation 140 (FIG. 4) to the destination logical drive 130 prior to the write request 138 being allowed. This process involves reading the original data on the source logical drive 126 and writing a copy of this data to the destination logical drive 130. This operation preserves the original data by writing it to the destination logical drive 130 before the data is overwritten by the execution of the write request at step 214. The method then proceeds to step 212.

Step 212: Update Bitmap

At step 212 the particular logical block copied to the destination logical drive 130 in step 210 is updated in a marking operation 142 (see FIG. 4) on the bitmap 132 by the RAID controller 104.

In this process, the bitmap 132 is updated to reflect the write-requested logical blocks of data which have been copied in step 210. The bitmap 132 can then be referred to in the sequential copy steps 202, 204. Since the write-requested logical blocks have already been copied to the destination logical drive 130, there is then no need to copy these blocks again in the read and write steps 202, 204 of the sequential copy process. In other words, at step 212 it is specified by the bitmap 132 that said write-requested data in the particular logical block is ignored and not copied during said sequential copying in steps 202 and 204.

As an alternative, this step may occur at a different point in the process to that described herein, e.g. the write-requested logical block may be marked on the bitmap 132 subsequent to the execution of the write request to the write-requested logical block on the source logical drive 126.

The bitmap 132 may also be used in the case where a second write request is received to the same data area. In this case, the first write request will have triggered the copying at step 210 and the updating of the bitmap 132 at step 212. Therefore, there is no need to copy any data from this data area and this second write request can simply be written straight to the source logical drive 126.

The method then proceeds to step 214.

Step 214: Allow Write Request to Logical Block

Once the original data in the write-requested logical block has been copied to the destination logical drive 130, then that particular logical block of data is now recorded safely and the write request 138 to that particular logical block can be allowed.

The method then proceeds to step 216.

Step 216: Move to Next Available Logical Block in Sequence

At step 216, the sequential copy process proceeds. In this example, after a copy process of the first logical block of data from the source logical drive 126 to the destination logical drive 130 in steps 202 and 204, then at step 218 the process moves to the next available logical block in the sequence of logical blocks. In other words, the sequential copy process moves to data stored in another data area. In this example, this will usually be the next block in the sequence of 0 to N.

However, if at step 212 the next logical block has been marked on the bitmap 132 not to be copied, then the process proceeds to the next available logical block (i.e. the next logical block in sequence which has not been marked on the bitmap 132 to be ignored during the copy process). In other words, the process skips the data in the data area which has been marked on the bitmap 132 to be ignored.

The method then proceeds back to step 202 wherein the selected logical block is read and then, at step 204, written to the destination logical drive 130 to complete the copy process for that particular block of data.

This process continues in a sequential copy process until it is determined at step 206 that all logical blocks have been copied from the source logical drive 126 to the destination logical drive 130.

Alternative sequence patterns may be used. The data may be read in any suitable sequence format; for example, in terms of logical blocks, data addresses or data areas, hard drive sectors or particular regions of the physical drive. Further, any suitable sequence of data area copying may be used; for example, random, a count down from logical block N to logical block 0, or a different sequential copy pattern arranged in terms of rows, columns or any other pre-determined order.

The method then proceeds to step 218.

Step 218: Finish Duplication

At step 218, the destination logical drive 130 now contains an exact copy of the data on the source logical drive 126 at the moment the duplication process was initialised.

The above-described embodiment of the present invention enables the destination logical drive removes the requirement for a snapshot process in a logical drive duplication operation. Therefore, a separate snapshot data area is not required and this decreases the corresponding complexity of managing conventional snapshot-related data resources.

Further, the embodiment of the present invention described above enables the duplication process to be carried out more straightforwardly and at higher speed. This is because there is no requirement for an entire copy of snapshot data to be re-applied to the destination logical drive 130 after the sequential copy operation has completed. Consequently, because the embodiment described above ensures that write-requested data has already been copied to the destination logical drive 130 before executing a write request, no further data transfers are required once the sequential copy process has been completed.

Variations of the above embodiments will be apparent to the skilled person. The precise configuration of hardware and software components may differ and still fall within the scope of the present invention.

For example, whilst the above examples have been shown and described with reference to a RAID arrangement, this need not be so. Any suitable arrangement of physical drives or logical drive managers could be used. For example, a single drive could be represented by a single logical drive.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method of creating an identical copy of a source logical drive on a destination logical drive, the destination logical drive being directly accessible for read/write operations, the method comprising:
   starting a duplication operation;
   sequentially copying data from the source logical drive to the destination logical drive; and
   determining whether, subsequent to starting said duplication operation, a write request is received to a data area on the source logical drive which has not yet been copied to said destination logical drive by said sequential copy process and, if such a write request is received during said sequential copy process:
   copying, independently of said sequential copy process, the data at said write-requested data area to the destination logical drive;
   executing said write request; and
   ignoring the data at said write-requested data area during said sequential copying process.

2. A method according to claim 1, wherein if said write request is received, the method further comprises the step of storing information regarding said write-requested data area in a data file or memory.

3. A method according to claim 2, wherein said data file is a bitmap.

4. A method according to claim 2, wherein said step of ignoring said data at said write-requested data area comprises determining, from said data file or memory, the data area to be ignored during said sequential copying.

5. A method according to claim 1, wherein said data is arranged in a plurality of logical blocks.

6. A method according to claim 5, wherein the step of sequential copying starts with the first or last logical block in a group of logical blocks.

7. A method according to claim 6, wherein the step of sequential copying starts with the first or last logical block on the source drive.

8. Apparatus for creating an identical copy of a source logical drive on a destination logical drive, the destination logical drive being directly accessible for read/write operations, the apparatus comprising:
   a controller comprising a physical processor, the controller operable to start a duplication operation and to copy sequentially data from the source logical drive to the destination logical drive; and
   an access manager operable to determine whether, subsequent to starting said duplication operation, a write request is received to a data area on the source logical drive which has not yet been copied to said destination logical drive by said sequential copy process and, if such a write request is received during said sequential copy process, the controller is further operable to:
   copy, independently of said sequential copy process, the data at said write-requested data area to the destination logical drive;
   execute said write request; and
   ignore the data at said write-requested data area during said sequential copying process.

9. Apparatus according to claim 8, wherein if said write request is received, the apparatus is operable to store information regarding said write-requested data area in a data file or a memory.

10. Apparatus according to claim 9, wherein said data file is a bitmap.

11. Apparatus according to claim 9, further operable to determine, from said data file or memory, the data area to be ignored during said sequential copying.

12. Apparatus according to claim 8, wherein said data is arranged in a plurality of logical blocks.

13. Apparatus according to claim 12, wherein the apparatus is further operable to start said sequential copying with the first or last logical block in a group of logical blocks.

14. Apparatus according to claim 13, wherein the apparatus is further operable to start said sequential copying with the first or last logical block on the source drive.

15. Apparatus according to claim 8 in the form of a controller.

16. Apparatus according to claim 15 in the form of a RAID controller.

17. Apparatus according to claim 16, wherein the RAID controller comprises firmware, software or a combination of both on a host.

18. Apparatus according to claim 16, wherein the RAID controller comprises firmware, software or a combination of both in an off-host controller.

19. A data storage resource comprising at least one physical drive and a controller according to claim 15.

20. A non-transitory computer usable storage medium having a computer program product executable by a programmable processing apparatus, comprising one or more software portions for performing the steps of claim 1.

* * * * *